United States Patent

[11] 3,586,799

| [72] | Inventor | Frank W. Murphy, Jr.<br>3131 S. Sheridan Road, Tulsa, Okla. 74145 |
|---|---|---|
| [21] | Appl. No. | 814,055 |
| [22] | Filed | Apr. 7, 1969 |
| [45] | Patented | June 22, 1971 |

[54] MULTIPLE CONTACT GAUGE WITH ADJUSTABLE SELECTIVE CONTACT ARMS
5 Claims, 5 Drawing Figs.

| [52] | U.S. Cl. | 200/56, 200/52, 200/DIG. 2 |
|---|---|---|
| [51] | Int. Cl. | G01d 13/26 |
| [50] | Field of Search | 200/52 BA, 56 |

[56] References Cited
UNITED STATES PATENTS

| 2,381,547 | 8/1945 | Leininger | 200/52 (BA) |
|---|---|---|---|
| 2,564,528 | 8/1951 | Gearin | 200/56 |
| 2,814,796 | 11/1957 | Kozel | 200/56 X |
| 2,867,698 | 1/1959 | Gondolfo | 200/56 |
| 2,533,068 | 12/1950 | Thiele | 200/56 X |
| 2,923,786 | 2/1960 | Jones | 200/56 |

*Primary Examiner*—J. R. Scott
*Attorney*—Kimmel, Crowell & Weaver

ABSTRACT: A gauge having a plurality of adjustable contacts positioned about the face with a flexible contact mounted on the hand so that a plurality of electric circuits can be established and disestablished during the rotation of the hand about the face of the gauge.

INVENTOR
FRANK W. MURPHY, JR.

BY Kimmel, Crowell & Weaver
ATTORNEYS

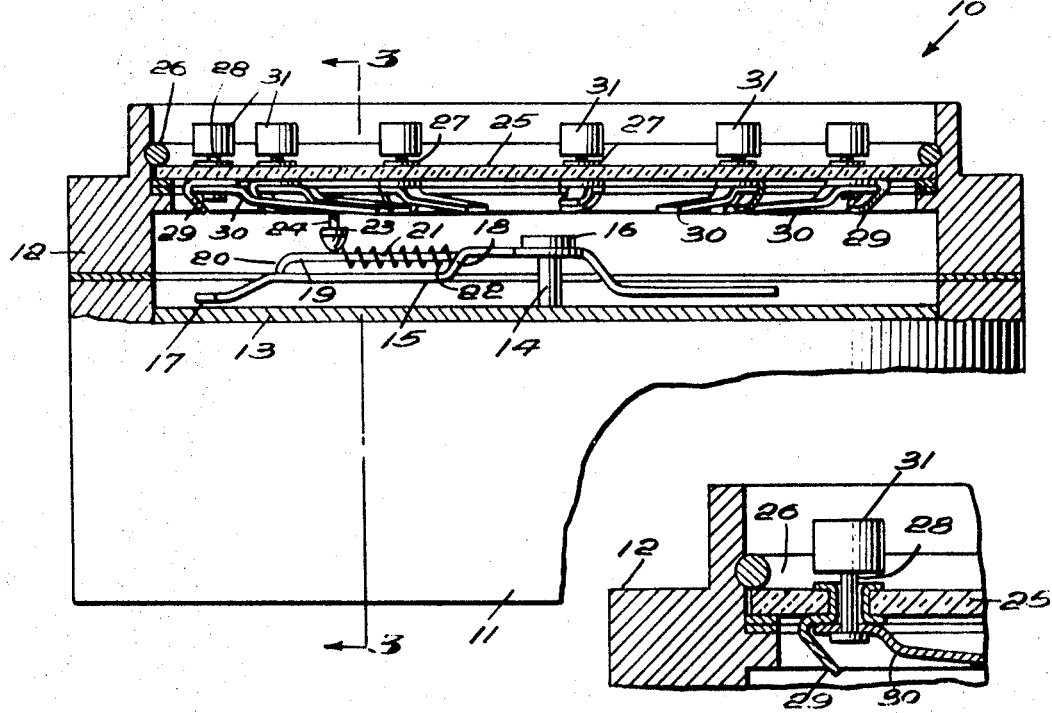
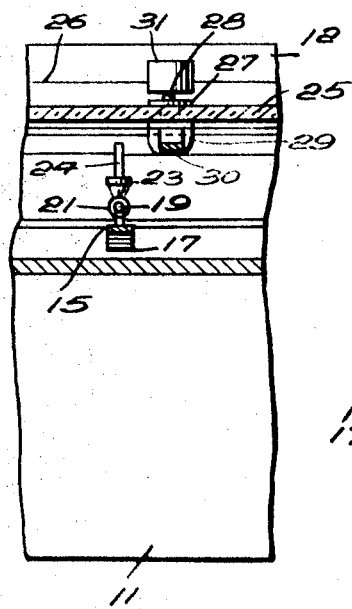
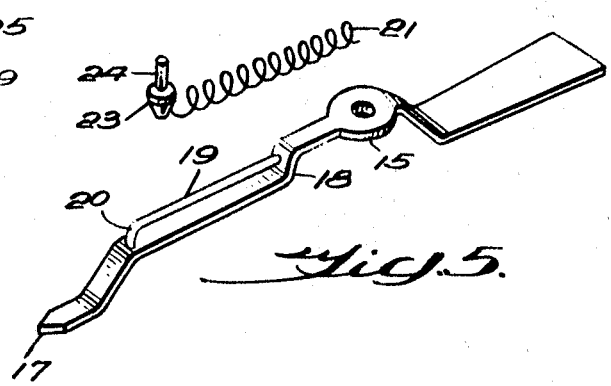

3,586,799

MULTIPLE CONTACT GAUGE WITH ADJUSTABLE SELECTIVE CONTACT ARMS

BACKGROUND OF THE INVENTION

1. Field of the Invention

The present invention relates to gauges of the type in which electric circuits are established by movement of the gauge hand into electrical contact with a point arranged on the gauge dial. The electric circuit established can be used for many different functions, such as controlling the operation of an internal combustion engine.

2. Description of the Prior Art

In prior art devices of this nature, fixed contacts are positioned in such a way that the hand of the gauge travels from one fixed contact to the other and further travel of the hand is prevented by the contact. In such devices, the hand is often sprung due to the forces tending to move the hand further than the fixed contact. Under such conditions the accuracy of the gauge is substantially reduced and further, it is only possible to use a pair of contacts in such instances since the gauge hand is always stopped at the contact. In other devices, a spring contact is arranged for the hand to engage and move by; however, the spring in such instances tends to retard the travel of the hand sufficiently to affect the accuracy of the gauge.

SUMMARY OF THE INVENTION

The present invention includes a plurality of contacts which can be swung into and out of the path of travel of the hand and the hand is provided with a spring contact member which will engage the swingable contact on the dial to establish a circuit and will easily be moved out of its contacting position by further movement of the hand so that the spring contact can slip by the swinging contact as the hand moves to permit the next contact to be engaged by the hand contact. For this arrangement a number of separate circuits can be established and disestablished during the movement of the hand across the face of the dial. Further, the swinging contacts can be swung out of the way of the path of the hand so that only one or any desired number of circuits can be established and disestablished as desired.

BRIEF DESCRIPTION OF THE DRAWINGS

FIG. 2 is a transverse section taken on the line 2-2 of FIG. 1 looking in the direction of the arrows;

FIG. 3 is a fragmentary sectional view taken on the line 3-3 of FIG. 2 looking in the direction of the arrows;

FIG. 4 is an enlarged detailed section of one of the contact mounting assemblies; and FIG. 5 is an exploded perspective view of the gauge hand and flexible contact.

DESCRIPTION OF THE PREFERRED EMBODIMENT

Figure 1:
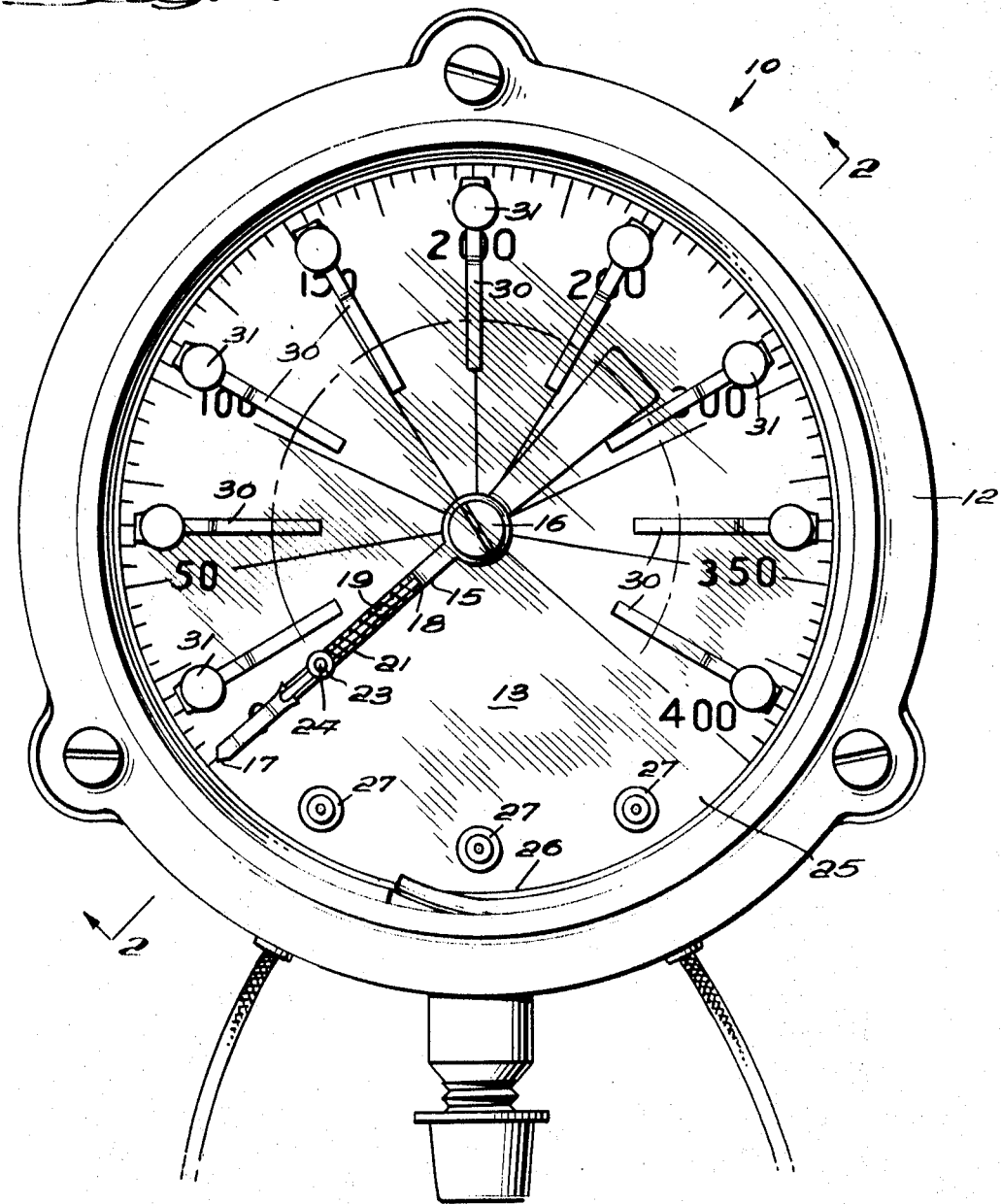
FIG. 1 is a plan view of the invention.

Referring now to the drawings in detail wherein like reference characters indicate like parts throughout the several figures, the reference numeral 10 indicates generally a multiple contact gauge constructed in accordance with the invention.

The multiple contact gauge 10 includes a gauge body 11 of generally cylindrical form having a closure frame 12 secured to the upper face thereof.

The gauge 10 has a dial 13 through which extends a shaft 14 centrally thereof. The shaft 14 is driven by a gauge mechanism within the housing 11 in a conventional manner so that the movement of the shaft 14 is related to a function being measured, such as pressure. A hand 15 is riveted to the upper end of the shaft 14 by a slotted head 16 formed on the shaft 14 and extends outwardly therefrom terminating in a gauge pointer 17. The hand 15 is offset downwardly at 18 and a shaft 19 is rigidly secured at its inner end to the offset 18 and has a downwardly offset outer end 20 rigidly secured to the hand 15 at a point adjacent the pointer 17.

A relatively light weight coil spring 21 is wound around the shaft 19 and has its inner end secured at 22 to the offset 18 in the hand 15. A contact body 23 is secured to the outer end of the spring 21 and has a contact post 24 extending upwardly therefrom, for reasons to be assigned. The contact body 23 and post 24 are adapted to swing on the spring 21 from a vertical position to a generally horizontal position.

A transparent cover 25 is secured in the closure frame 12 by a spring ring 26 in a conventional manner. The transparent closure 25 may be formed of plastic, glass, of any other suitable material.

A plurality of metal bushings 27 extend through the transparent cover 25 and journal a shaft 28 extending therethrough. A wire terminal 29 is formed on the lower end of the bushing 27 to receive an electric wire (not shown). A contact arm 30 is rigidly secured to the lower end of the shaft 28 and a knob 31 is secured to the upper end of the shaft 28. By rotating the knob 31, the shaft 28 is rotated carrying with it the contact arm 30. By rotating the contact arm 30 it can be swung to a position where it will miss the post 24 on the hand 15 and no contact will then be made as the hand 15 rotates. As will be seen in FIG. 2, the contact arm 30 slopes inwardly and downwardly so that it will not contact the adjacent contact arm 30 when it is being swung to its out of contact position.

As the hand 15 rotates, the post 24 will engage any contact arm 30 extending toward the center of the gauge 10 and will complete an electric circuit for any purpose desired. Further movement of the hand 15 will cause the post 24 to move about the shaft 19 winding or unwinding the spring 21, depending upon its direction of twist, and then will slide under the contact 30 and return to its upright position after the hand 15 has passed the contact 30 so as to be in a position to engage the next contact arm 30 in its path of movement.

Having thus described the preferred embodiment of the invention, it should be understood that numerous structural modifications and adaptations may be resorted to without departing from the spirit of the invention.

What I claim is:

1. A multiple contact gauge for controlling a plurality of electrical circuits of the type which includes an indicator hand and a transparent cover overlying the hand comprising a plurality of contact arms mounted on said transparent cover for establishing said circuits;

a resilient contact member mounted on said indicator hand; and means for swinging said multiple contact arms into and out of the path of travel of said resilient contact member on said indicator hand whereby selected ones of said electric circuits may be established upon contact of said contact member of said hand with selected ones of said plurality of contact arms.

2. A device as claimed in claim 1 wherein the means for swinging said contact arms comprises a shaft extending through said transparent cover with said contact arm secured to the lower end of said shaft; and a knob attached to the upper end of said shaft for rotating said shaft and said contact arm.

3. A device as claimed in claim 1 wherein said resilient contact on said indicator hand includes a shaft having its opposite end secured to said hand;

a coil spring encompassing said shaft and having one end anchored to said hand; and a contact post secured to the opposite end of said coil spring and extending perpendicularly upwardly from said hand.

4. A device as claimed in claim 2 wherein said resilient contact on said indicator hand includes a shaft having its opposite end secured to said hand;

a coil spring encompassing said shaft and having one end anchored to said hand; and a contact post secured to the opposite end of said coil spring and extending perpendicularly upwardly from said hand.

5. A device as claimed in claim 4 wherein said contact arm slopes inwardly and downwardly away from said transparent cover to provide clearance to permit swinging of said contact arms without interference with adjacent contact arms